United States Patent [19]

Loosen

[11] Patent Number: 4,695,911
[45] Date of Patent: Sep. 22, 1987

[54] FLOPPY DISKETTE PROTECTION DEVICE

[76] Inventor: Ron Loosen, 10885 Portal Dr., Los Alamitos, Calif. 90720

[21] Appl. No.: 730,678

[22] Filed: May 3, 1985

[51] Int. Cl.$^4$ .......................................... G11B 23/03
[52] U.S. Cl. ..................................... 360/133; 206/444
[58] Field of Search ................... 360/133, 135, 130.34, 360/99, 97, 86; 206/444, 405; 369/291

[56] References Cited

U.S. PATENT DOCUMENTS

| | | | |
|---|---|---|---|
| 4,094,012 | 6/1978 | Perlegos et al. | 365/226 |
| 4,120,012 | 10/1978 | Bowers | 360/133 |
| 4,185,314 | 1/1980 | Hatchett et al. | 360/133 |
| 4,471,397 | 9/1984 | Cloutier | 206/444 X |
| 4,525,758 | 6/1985 | Nakagawa et al. | 206/444 X |

FOREIGN PATENT DOCUMENTS

| | | | |
|---|---|---|---|
| 3128281 | 2/1983 | Fed. Rep. of Germany | 360/99 |
| 2537320 | 6/1984 | France | 369/291 |
| 0017573 | 2/1983 | Japan | 360/133 |
| 0130476 | 8/1983 | Japan | 360/133 |
| 0003756 | 1/1984 | Japan | 360/133 |

OTHER PUBLICATIONS

Miyasaka et al, "Array and Gb Logic", 2/11/82, ISSCC 82, pp. 182, 183.
Ip et al, "Nonvolatile Memories", 2/23/84, ISSCC 84, pp. 138, 139.

Primary Examiner—Robert S. Tupper
Assistant Examiner—Andrew L. Sniezek
Attorney, Agent, or Firm—Spensley Horn Jubas & Lubitz

[57] ABSTRACT

A protection device for floppy diskettes is described. In some embodiments, the protection device may be installed on already existing floppy diskettes to protect them from environmental contamination when not in use or incorporated during manufacturing. Rotatable shutter assemblies are disposed on each side of the diskette and may be deployed to alternately cover and uncover the openings in the diskette jacket. In one embodiment, the shutter assemblies comprise a multi-layered structure having rotatable shutters and spacer members disposed between a bottom layer and a common top layer and located so that the assembly may be folded over an edge of a floppy diskette, thereby placing a shutter on each side of the diskette. Except where the device is folded over the edge of the floppy diskette, none of the device extends beyond the edges of the floppy diskette including the shutters, both in their positions covering such openings and in their positions uncovering such openings. The shutters are operable through a side of the disk. No modification is necessary to enable a disk drive to accommodate a floppy diskette employing the protection device of the present invention.

13 Claims, 18 Drawing Figures

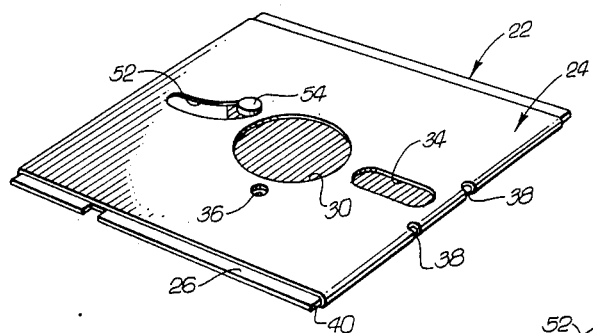
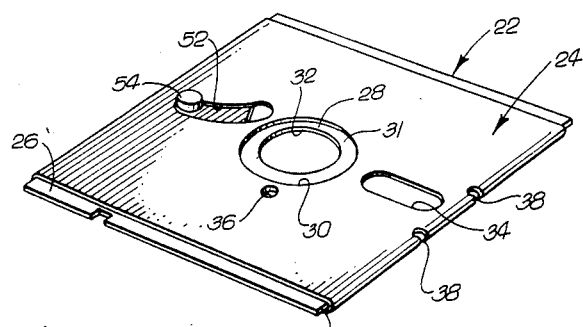
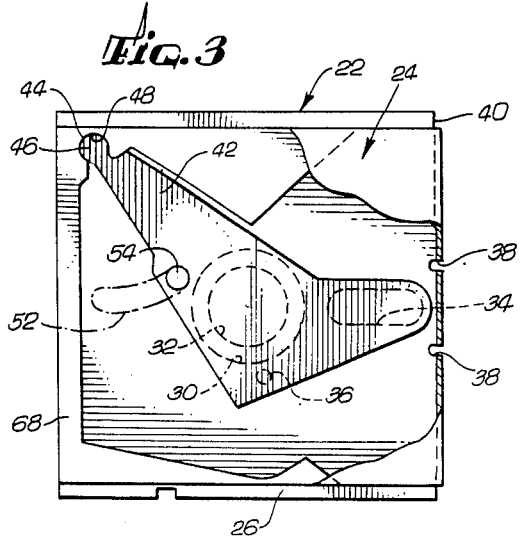
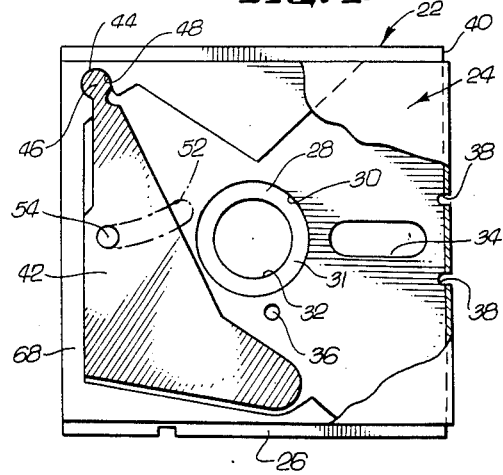

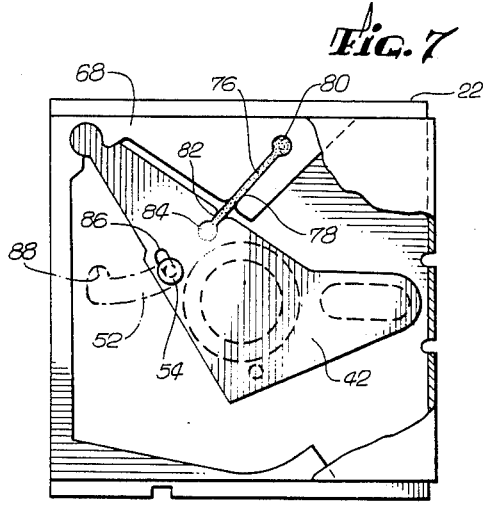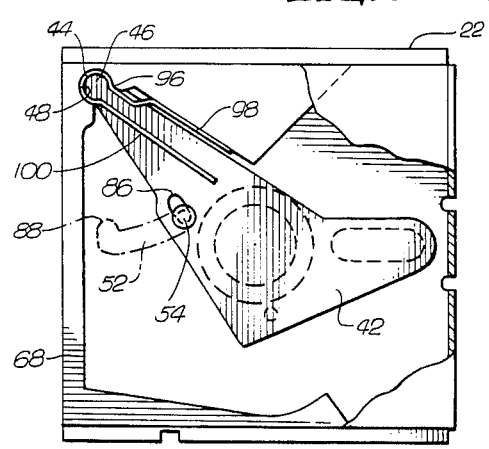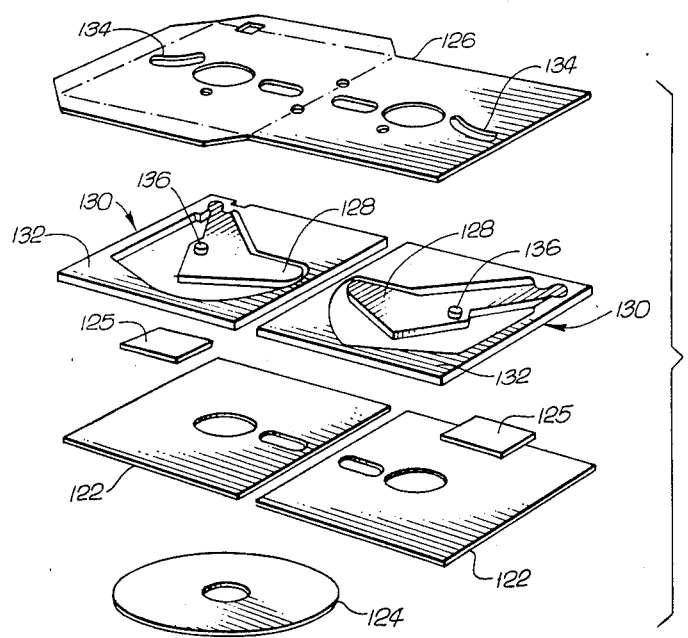

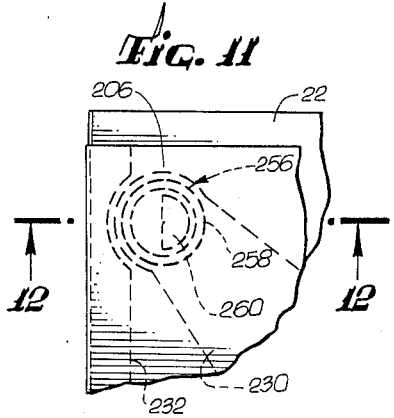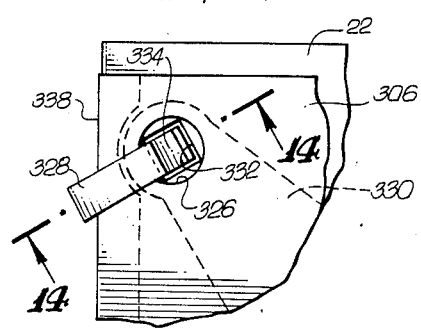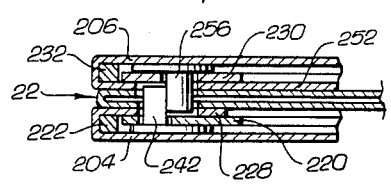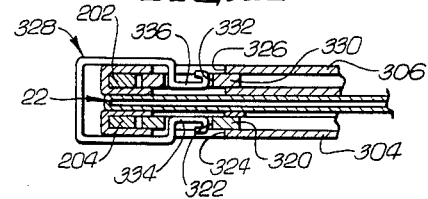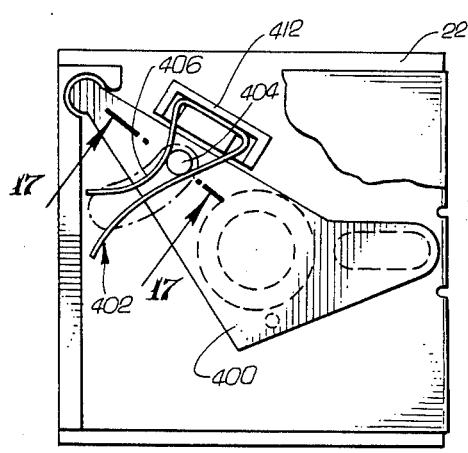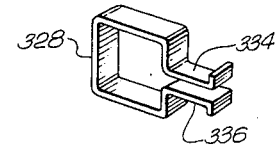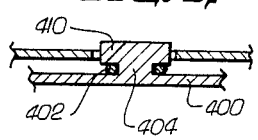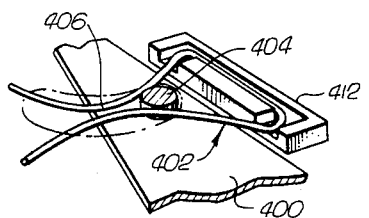

FLOPPY DISKETTE PROTECTION DEVICE

BACKGROUND OF THE INVENTION

This invention concerns protection devices for magnetic recording media of the type commonly known as floppy disks or floppy diskettes, and in particular, for those floppy diskettes employing thin jackets, as well as other recorded media.

Contamination from the environment can reduce the performance of floppy diskettes. Such contamination may be the result of airborne particulate matter, such as dust, oil, grease and dirt from human handling, as well as oxide redeposits from the diskettes themselves.

A floppy diskette typically comprises a thin circular disk, one or both sides of which are coated with a magnetic material. The disk has a central opening adjacent to which a disk drive may engage the disk in order to rotate it. The disk is disposed in a thin envelope-like jacket of essentially square construction which has central openings adjacent to the central opening of the disk, but somewhat larger than it in order to permit the disk drive to engage the disk. In addition, the jacket has read-write access openings which permit magnetic heads to engage the information storing portion of the disk to read or write thereon, and/or to allow pressure pads to press against the disk. The jacket of the floppy diskette may be made of a thin stiffened material, such as paper or polyvinyl chloride. Other openings, such as for synchronization purposes may also be provided.

When not in use, floppy diskettes are often stored in envelopes which cover the central openings in the jacket, the access openings for the magnetic heads and any other openings provided in the jacket. These envelopes are typically made of a special paper-like material which has the quality of reducing the likelihood of transferring dust from the envelope to the floppy diskette, such as the material marketed under the name "Tyvek" and sometimes of paper itself or other materials.

While the use of a jacket around the disk reduces to a great extent the contamination which finds its way to the magnetic information bearing surfaces of the floppy diskette, contamination still reaches the disk through the access openings and any other openings in the diskette jacket. The storing of the jacketed floppy diskette in an envelope when not in use helps alleviate the problem.

Unfortunately, for various reasons, floppy diskettes may not be immediately replaced in their envelopes after use. This may result from the envelope being temporarily misplaced or from user hurry or carelessness. The result is that the possibility of contamination of the floppy diskette surface is increased, with a consequent potential for impaired or reduced performance.

In view of the foregoing, it will be realized that it would be advantageous to include integral with a floppy diskette means to cover the openings in the jacket when the floppy diskette is not in use. Floppy diskettes of several sizes are in use. One size which presents constraints with respect to covering the openings in the jacket is the 5¼ inch floppy diskette which may have central openings in its jacket larger than 1½ inches in diameter and small openings adjacent thereto for syncronization purposes on the order of ¼ inch in diameter, in addition to the read-write access openings. In addition, severe constraints exist which limit the thickness of any means used to cover the openings in the jacket, since the floppy diskettes must often be inserted into narrow slots. These constraints exist especially along the edges and in the area of the read-write access openings.

The means for covering the openings in the jacket when the floppy diskette is not in use should be neither complex nor expensive, should not interfere with the operation of disk drives and should not require any modification to disk drives. Additionally, such means should be adaptable for use by users with their presently existing floppy diskettes and diskettes so adapted should be fully compatible and interchangeable with diskettes not so adapted.

No known device or system prior to the present invention has satisfied these coals.

U.S. Pat. No. 4,120,012 to Bowers describes a floppy diskette in which pivoting doors are provided within the jacket for covering the access openings. The pivoting doors require modification to the disk drive so that a tab or other part of the doors extending out beyond the edges of the floppy diskette jacket may be engaged when the floppy diskette is inserted into the disk drive or so a special pin within the disk-drive intrudes within the floppy diskette jacket.

This device does not cover the central opening of the floppy disk jacket; to do so in the case of the pivoting door described would require a greater range of angular rotation between the open and closed positions. This would necessitate further travel and greater lengths for the tabs or other parts which extend beyond the edges of the floppy diskette jacket or further intrusion into the diskette by the pin, than is taught by Bowers. It is not clear that a pin could practically intrude into the diskette far enough to rotate a door sufficiently to cover and uncover the central opening in the jacket as well as the read-write access openings without interfering with the disk itself.

In addition, these devices are not employable with already existing floppy diskettes, but would require special construction. In addition, the use of those devices all entail the inclusion of additional unsealed openings in the floppy disk jacket which, although small, nonetheless are undesirable.

Also described in Bowers is a sliding door mechanism located outside the floppy diskette. This embodiment keeps the door, as well as the tracks within which the door slides, in close proximity to the read-write access openings even while the door is open and the diskette is being used, enhancing the possibility of interference with the magnetic heads or associated apparatus in the disk drive. This device does not cover the central opening. It is not seen how any modification of the device could cover the openings in a typical 5¼" floppy diskette.

SUMMARY OF THE INVENTION

It is an object of the present invention to provide a device which is capable of covering the access openings in a floppy diskette jacket as well as the other openings in the jacket when the diskette is not in use, and to do so in a device which can be deployed integrally with the floppy diskette, thereby eliminating the necessity of using removable protective envelopes which may be misplaced or not used.

It is another object of the invention to provide such a device which is usable for existing floppy diskettes as well as which can be incorporated into newly manufactured floppy diskettes.

It is a further object of the present invention to provide such a device whose operation is completely independent of any disk drive in which the floppy diskette may be used and which requires no modifications to any disk drive.

Still another object of the invention is to provide such a device which is of simple and inexpensive construction and easily installed by end users.

These and other objects are achieved in various embodiments of the present invention, some of which embodiments achieve all of the above objects, and some of which achieve most of these objects.

In each of these embodiments, rotatable shutter assemblies are disposed on each side of the diskette and may be deployed to alternately cover and uncover the openings in the diskette jacket. In one embodiment, the shutter assemblies comprise a multilayered structure having rotatable shutters and spacer members disposed between a bottom layer and a common top layer, and located so that the assembly may be folded over an edge of a floppy diskette, thereby placing a shutter on each side of the diskette. Adhesive material attached to the bottom surface of the bottom layer holds the assembly in place on the floppy diskette.

In an alternate embodiment, many of the spacing members as well as a portion of the bottom layer are integrally formed with the top layer. By folding over the spacing members, inserting other required spacing members and the shutters, and folding over the bottom members, the assembly which may then be placed over the two sides of the floppy diskette, is formed.

Another embodiment may be included within a floppy diskette jacket during the fabrication process, the bottom layers of the assembly being placed adjacent the disk while the floppy diskette jacket forms the top layer. Still another embodiment eliminates these bottom layers.

The various embodiments of the present invention may employ various features. For example, an elastic member may be employed to bias the shutters in the closed position when the floppy diskette is not in use. The elastic member may be an elastomer of rubber or similar material or a spring. The elastic member serves to insure that the shutter does not accidently open when the floppy diskette is not in use.

Access to the shutter may be provided through an access slot in the top layer of the assembly. Through the access slot, the shutter may be moved alternately between the opened and closed positions. Alternatively, a lever connected to the pivot of the shutter may be employed, eliminating the need for the slot.

Another feature which may be employed with various embodiments of the present invention is an hourglass spring along which a grooved protrusion on the shutter slides when the shutter rotates. The hourglass spring, in its narrow region, provides resistance to the movement of the shutter to the opposite position, thereby preventing the shutter from being inadvertently opened or closed.

With the embodiments of the present invention, the movement of the shutters on either side of the disk may be independent or coupled. The coupling may be by means of a rivet or other interlocking assembly, which requires openings in a corner of the floppy diskette jacket, or by means of an external coupling spring, which does not require such an opening.

It will become apparent from the embodiments of the present invention described herein that these are but a few of the various features that may be used in the present invention.

DESCRIPTION OF THE DRAWINGS

FIG. 1 is a perspective view of a floppy diskette employing a first preferred embodiment of the present invention, with the shutters in the position covering the openings in the floppy diskette jacket.

FIG. 2 is a perspective view of the floppy diskette and the first preferred embodiment of the present invention shown in FIG. 1 with the shutters in the positions uncovering the openings in the floppy diskette jacket.

FIG. 3 is a partially cutaway, plan view of the floppy diskette and the first preferred embodiment of the present invention shown in FIG. 1 with the shutters in the positions shown in FIG. 1.

FIG. 4 is a partially cutaway, plan view of the floppy diskette and the first preferred embodiment of the present invention shown in FIG. 1 with the shutters in the positions shown in FIG. 2.

FIG. 7 is a partially cutaway, plan view of a floppy diskette and an alternate embodiment of the present invention employing a biasing elastomer.

FIG. 8 is a partially cutaway, plan view of a floppy diskette and another preferred embodiment of the present invention employing a biasing spring.

FIG. 9 is an exploded view of another embodiment of the present invention in which the shutters are within the floppy diskette jacket.

FIG. 11 is a view of a corner of a floppy diskette on which the preferred embodiment shown in FIG. 10 has been installed showing the fastening means used to couple the rotation of the two shutters to one another.

FIG. 12 is a cross-sectional view, not to scale, of the corner of a floppy diskette and the embodiment of the present invention shown in FIG. 10, taken along the lines 12—12 in FIG. 11.

FIG. 13 is a view of a corner of a floppy diskette on which the preferred embodiment of the present invention shown in FIG. 10 is installed, showing an alternate means to couple the rotation of the two shutters to one another which does not require auxillary openings in the floppy diskette jacket.

FIG. 14 is a cross-sectional view, not to scale, of the of the corner of the floppy diskette and the embodiment of the present invention shown in FIG. 13, taken along the lines 14—14.

FIG. 15 is a perspective view of the spring used in the embodiment illustrated in FIGS. 13 and 14.

FIG. 16 is a partially cutaway, plan view of a floppy diskette having an embodiment of the present invention employing an hourglass spring and spring cam to secure the shutter alternately in the open and closed positions.

FIG. 17 is a cross-sectional view of the hourglass spring and spring cam taken along the lines 17—17 in FIG. 16.

FIG. 18 is a perspective view of the hourglass spring and associated components, including the spring retaining block, for the embodiment of the present invention illustrated in FIG. 16.

DESCRIPTION OF THE INVENTION

Figure 5:
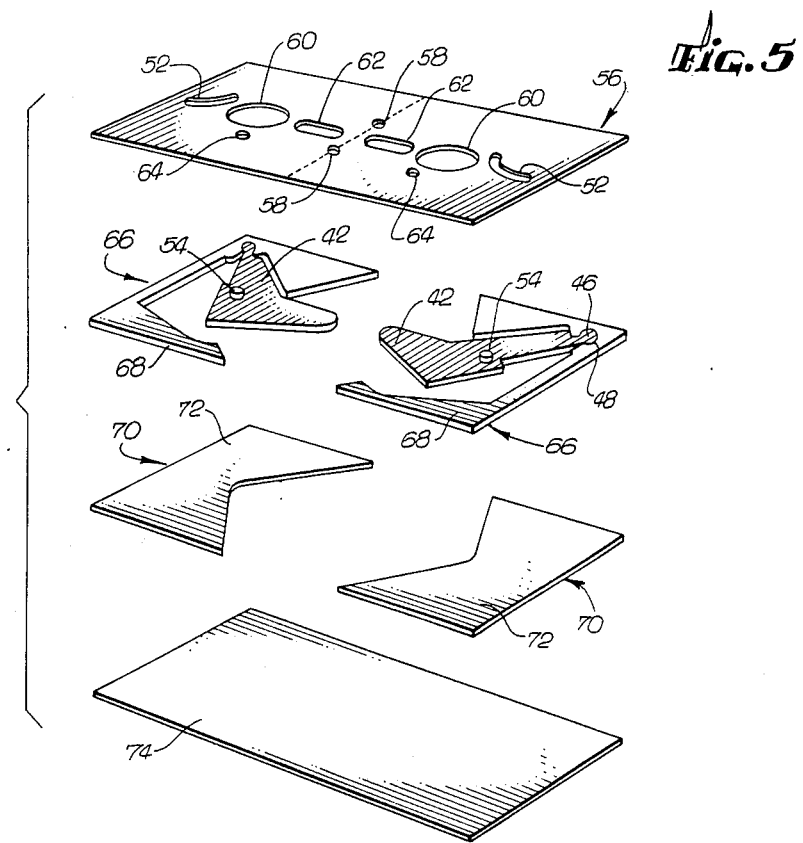
FIG. 5 is an exploded view of the first preferred embodiment of the present invention.

The present invention can be used to protect floppy disks of virtually any size, and is especially suited for protecting floppy disks which are disposed in thin flexible jackets which are often made of polyvinyl chloride or a similar material. The use of the present invention does not interfere with the operation of disk drives nor does it require any modification to disk drives, so that both floppy diskettes that employ the present invention and those that do not may be interchangeably used as desired. With the floppy diskette protection device of the present invention, a user may eliminate forever the use of auxillary envelopes with his or her entire library of floppy diskettes.

The following detailed description is of the best presently contemplated modes of carrying out the invention. This description is not to be taken in a limiting sense, but is made merely for the purpose of illustrating the general principles of the invention, since the scope of the invention is best defined by the appended claims.

The preferred embodiment first described with respect to the drawings is a floppy diskette protection device which is adapted to be inserted onto already existing floppy diskettes by the end users. Referring first to FIG. 1, a floppy diskette 22 on which has been inserted a protection device 24 of the first preferred embodiment of the present invention is shown. The floppy diskette 22, whose attributes can be seen most clearly in FIG. 2, comprises a jacket 26 which contains a rotatable magnetic disk 28 having a central opening 32. Jacket 26 contains several openings. These openings include central openings 30 which allow access to an annular central portion 31 of the disk 28 surrounding the central opening 32 in the disk 28. The jacket 26 is also provided with read-write access openings 34 for the magnetic heads and pressure pads of disk drives. Synchronization openings 36 may also be located in jacket 26. The floppy diskette jacket 26 has two small notches 38 near its edge 40 closest to the access openings 34. The notches 38 serve to align the floppy disk 22 in a disk drive, as the floppy disk 22 is inserted with the edge 40 inserted first.

The floppy diskette jacket 26 is typically made of a thin layer of polyvinyl chloride or other material and is fabricated from a single sheet of such material. To form the jacket 26, a sheet of such material having the required openings in it is folded along a line around the disk; flaps 39, seen in FIG. 6, extending from the edges of half the sheet are folded over the edges of the opposite side to form an envelope-like structure.

As seen in FIGS. 3 and 4, a shutter 42 can alternately cover and uncover the central opening 30, the access opening 34 and the synchronization opening 36 in one side of the jacket 26. Another shutter is provided for the opposite side of the jacket 26. Shutter 42 is a thin flat member pivoted at an end which is located near the corner of the floppy diskette 22. That end 44 comprises a circular protrusion 46 which rotates about its center in a corresponding circular socket 48 located in a spacer member 68 of the protection device 24. A small upwardly facing protuberance 54 extends from the top of shutter 42 through an arcuate slot 52 located in the top layer of the protection device 24 and centered about the axis of rotation of shutter 42. Movement of protuberance 54 in slot 52 rotates the shutter 42 in socket 48 to cover or uncover the openings in the jacket 26, i.e. the central opening 30, the access opening 34 and the synchronization opening 36. Protuberance 54 may be replaced by a groove or grooves in the shutter 42 or other means which would permit a user to rotate shutter 42 through slot 52.

Figure 6:
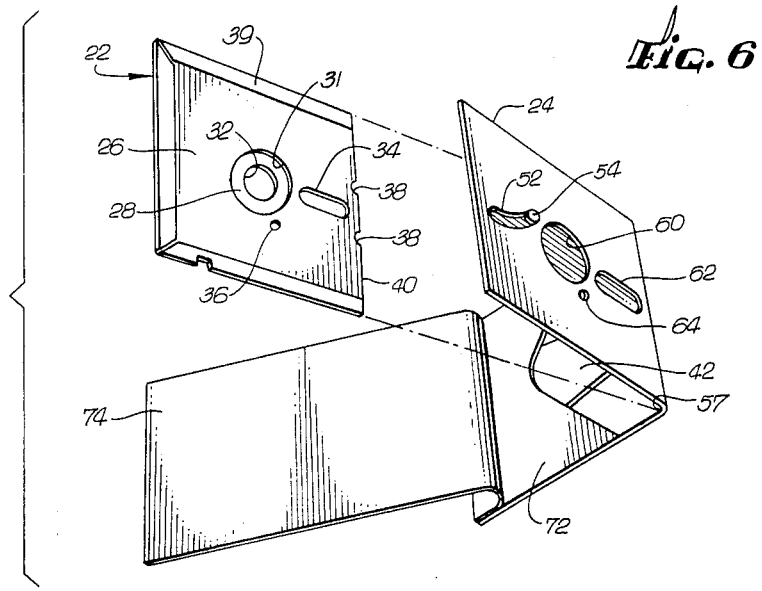
FIG. 6 is a perspective view of the first preferred embodiment of the present invention with its backing layer partially removed, illustrating the installation of the present invention onto a floppy diskette.

The construction employed for the first preferred embodiment of the present invention can be understood with reference to FIGS. 5 and 6. A single sheet of material forms the top layer 56 of the protection device 24. Top layer 56 is preferably formed of a paper-like material of a type which is used to make envelopes for floppy disks, such as for example the material known under the name "Tyvek". Top layer 56 is on the order of approximately twice the length of floppy diskette 22 and slightly less than the width of floppy diskette 22 so that it does not interfere with the insertion of floppy diskette 22 into a disk drive. Along its center line 57, top layer 56 has two small openings 58 which correspond to the notches 38 in the edge 40 in a floppy diskette 22 as well as openings 60, 62 and 64 corresponding respectively to the central openings 30, the access openings 34 and the synchronization openings 36 in a floppy diskette 22. Slots 52, previously referred to, along which the protuberances 54 (by which the shutters 42 are rotated) moves, are also provided in the top layer 56.

The intermediate layer 66 comprises a spacer member 68 and a shutter 42 corresponding to each side of the floppy diskette 22. Shutter 42 is of a dog-leg type shape in order to cover and uncover the openings 30, 34 and 36 in the jacket 26. Each spacer member 68 may actually be more than one member. Each spacer member 68 adjoins a large free central area in which the shutter 42 moves between its position covering the openings 30, 34 and 36 in the jacket 26 and that uncovering such openings. Spacers member 68 stops the motion of shutter 42 in the positions covering and uncovering the openings, shutter 42 abutting the spacer member 68 at its end points of travel. The circular protrusion 46 of shutter 42 is engaged by a socket 48 formed in spacer member 68 which permits shutter 42 to rotate in the plane of spacer member 68 about the center of circular protrusion 46. Both spacer member 68 and shutter 42 are preferably formed of a thin stiffened material. Polyvinyl chloride of the type used to fabricate the jacket 26 of the floppy diskette 22 is one preferred material for the spacer member 68 and shutter 42.

The spacer members 68 are approximately the same width as the top layer 56. The two spacer members 68 are located primarily away from edge 40 and access openings 34 so as to not interfere with the use of the diskette 22.

The bottom layer 70 is comprised of a bottom member 72 corresponding to each side of the floppy diskette 22. Each bottom member 72 is located primarily toward the side of the protection device 24 away from edge 40 and away from the central opening 30, the access openng 34 and the synchronization opening 36 for each side of jacket 26. Bottom member 72 may be fabricated of the same material used to fabricate top layer 56.

Two purposes are served by bottom members 72. They hold the shutters 42 in place in the intermediate layer 66 before the protection device 24 is installed onto a floppy diskette 22, and because of the flaps 39 which are folded over one side of jacket 26 of the floppy diskette 22, a layer on the jacket 26 which overlaps the edges of the flaps 39 is provided by one of the bottom members 72. Without such a layer on the side of the jacket 26 which contains the flaps 39, the shutter 42 deployed on that side could have its movement impeded by the flaps 39 while the shutter 42 is attempting to uncover the openings in the jacket 26.

In the preferred embodiment, suitable adhesive substances are used to attach the top layer 56 to the intermediate layer 66 and the intermediate layer 66 to the bottom layer 70 in such a manner that the protuberances 54 of the shutters 42 extend through the slots 52 in the top layer 56 and the shutters 42, thereby contained, may be rotated by means of the protuberances 54.

A backing member 74, preferably of paper, is removably attached to the bottom of the bottom member 72 to cover an adhesive substance thereon until the protection device 24 is deployed by attachment to a floppy diskette 22.

To insert the protection device 24 onto a floppy diskette 22, the backing member 74 is peeled away from the bottom members 72. As shown in FIG. 6, the floppy diskette 22 is placed with its edge 40 against center line 57 along which the protection device 24 is to be folded over the diskette 22. The edge 40 is in fact placed against the bottom surface of the top layer 56, the intermediate and bottom layers 66 and 70 respectively being separated as described to permit this. The protection device 24 is then folded over with the bottom members 72 of the bottom layer 70 being pressed against the two sides of the jacket 26, adhering thereto by virtue of the adhesive material disposed thereon, the openings in the protection device 24 corresponding to the central openings 30, the access openings 34 and the synchronization openings 36 in the jacket 26 being aligned therewith.

As can be seen most clearly in FIGS. 1 through 4, the protection device 24 covers most of the two sides of the floppy diskette 22, with the exception of narrow portions of the jacket 26 along the two edges adjacent the edge 40. Since disk drives typically have grooves for engaging these edges, by recessing the protection device 24 away from these edges, interference by the protection device 24 with the disk drive is avoided. The layers of materials used with the present invention are very thin, on the order of 0.010 inches or less to avoid interference.

In the preferred embodiment just described, the shutters 42 on each side of the floppy diskette 22 may be moved alternately between a position covering the openings 30, 34 and 36 in the floppy diskette 22 and one uncovering those openings. Additionally, the shutter 42 may assume a position between a full covering or uncovering of one or more of the openings in the jacket 26. This could occur inadvertently and is not desired. The embodiments of the present invention shown in FIGS. 7 and 8 address this problem.

The embodiment shown in FIG. 7 uses an elastomer member 76 attached at one end to spacer member 68 and at the other end to shutter 42. Elastomer member 76 is oriented so that the pulling force exerted by it tends to rotate shutter 42 to a position covering the openings 30, 34 and 36. In the preferred embodiment shown in FIG. 7, elastomer member 76 is partially accommodated in channel 78 located in the spacer member 68 with the point of attachment 80 set back from that edge of the spacer member 68 which is proximate to the shutter 42 when shutter 42 covers the openings in the jacket 26. This set-back reduces the percentage increase in length of elastomer member 76 necessary to enable shutter 42 to rotate from its position covering the openings in the jacket 26 to its position uncovering those openings. A corresponding channel 82 may be located within the shutter 42 at the end of which the point of attachment 84 of the elastomer 76 is located.

Elastomer member 76 biases shutter 42 so that it is normally in the closed position covering the openings 30, 34 and 36 in the jacket 26. To uncover the openings, the shutter 42 is rotated by moving the protuberance 54 in slot 52 counteracting the force of elastomer member 76. In this embodiment, protuberance 54 is located in a short shutter slot 86 in shutter 42 oriented in a radial direction with respect to the rotation of shutter 42, while slot 52 in top layer 56 contains at its end furthest from the central opening 30 of jacket 26 a small notch 88 extending generally in the direction toward the pivot point of shutter 42.

When shutter 42 is opened by moving protuberance 54 in slot 52, protuberance 54 is slid within the shutter slot 86 into notch 88 to hold shutter 42 in the open position. To close shutter 42, protuberance 54 is moved within shutter slot 86 out of notch 88 where the elastic force of elastomer member 76 operates to close shutter 42.

A similar arrangement is used in the embodiment shown in FIG. 8. Instead of an elastomer member 76, a spring 96 is used. Spring 96 wraps around the protrusion 46 at the end 44 of shutter 42 located within socket 48 in the intermediate layer 66, necessitating in this embodiment that the protrusion 46 be sufficiently smaller than socket 48 to accommodate spring 96.

Spring 96 is preferably formed of a single piece of non-magnetic stainless steel material having a leg extending from each side out of socket 48. A first leg 98 extends along the edge of spacer member 68 in intermediate layer 66 or may be located within a groove within spacer member 68, where it is attached thereto. A second leg 100 extends from the other side of socket 48 and is attached to shutter 42. Second leg 100 may be located within a groove in shutter 42 or may be attached along the surface or to an edge of shutter 42.

Spring 96 is biased so that it naturally tends to force its first leg 98 and second leg 100 toward one another, thereby closing shutter 42. In a manner similar to that which has been described with respect to the embodiment shown in FIG. 7, protuberance 54 moveably located in shutter slot 86 may be used to open shutter 42.

An embodiment of the present invention in which the shutters are incorporated into the jacket of the floppy disk during the manufacturing process is illustrated in FIG. 9, which is an exploded view of that embodiment. In the embodiment illustrated in FIG. 9, the bottom members 122 which correspond to the bottom members 72 are located adjacent to the disk 124 itself. These members 122 are made of a special liner material usually used to line a floppy diskette jacket on its inside surfaces facing the disk 124. Shield members 125 protect the bottom members 122 from possible abrasion due to movement of the shutters 128 in the areas of the slots 134.

The intermediate layer 130, which contains the shutters 128 and the spacer member 132, may be similar to that described with respect to the embodiment shown in FIGS. 1 through 6.

The jacket 126 is substantially similar to a jacket typically used with floppy diskettes. The jacket 126, however contains arcuate slots 134 through which protuberances 136 on the shutters 128 extend for operation of the shutters 128.

In view of the fact that the jacket 126 contains the bottom members 122 the intermediate layer 130 containing the spacer members 13 and the shutters 128 as well as the disk 124, jacket 126 may be sized to be slightly thicker than the typical floppy diskette jacket. However, such increase in thickness is kept sufficiently small in order that jacket 126 still be accommodated by disk drives in which the floppy diskette may be used.

Materials similar to those used described with respect to the previously described embodiments may be used.

An alternate embodiment of the present invention in which the shutters are incorporated into the jacket of the floppy diskette eliminates the use of the bottom members 122. Spacer members 132 used in the embodiment shown in FIG. 9 may or may not be used. Since the shutters 128 would then be placed in contact with the disk 124, they are lined with the material usually used to line the floppy diskette jacket on its surfaces facing the disk 124. Similarly, the jacket 126 would also be lined with this material. Also, because of the elimination of the bottom members 122, arcuate slots 134, which would expose the disk 124 to the environment, and the protuberances 136 on the shutters 128, are not used. Instead, a rivet or other means of attachment is placed through the two sides of a corner of the jacket 126 as well as through the shutters 128. This may be done, for example, in a manner similar to that which will be described with respect to FIGS. 10 and 12. A linear extension along the surface of the jacket 126 from the rivet or other means used to couple the disks serves as a lever to move the shutters 128 to alternately cover or uncover the openings in the floppy diskette jacket. The exterior of the floppy diskette jacket may be provided with detents or other means to secure the lever in positions corresponding to the openings in the jacket being covered and uncovered.

Figure 10:
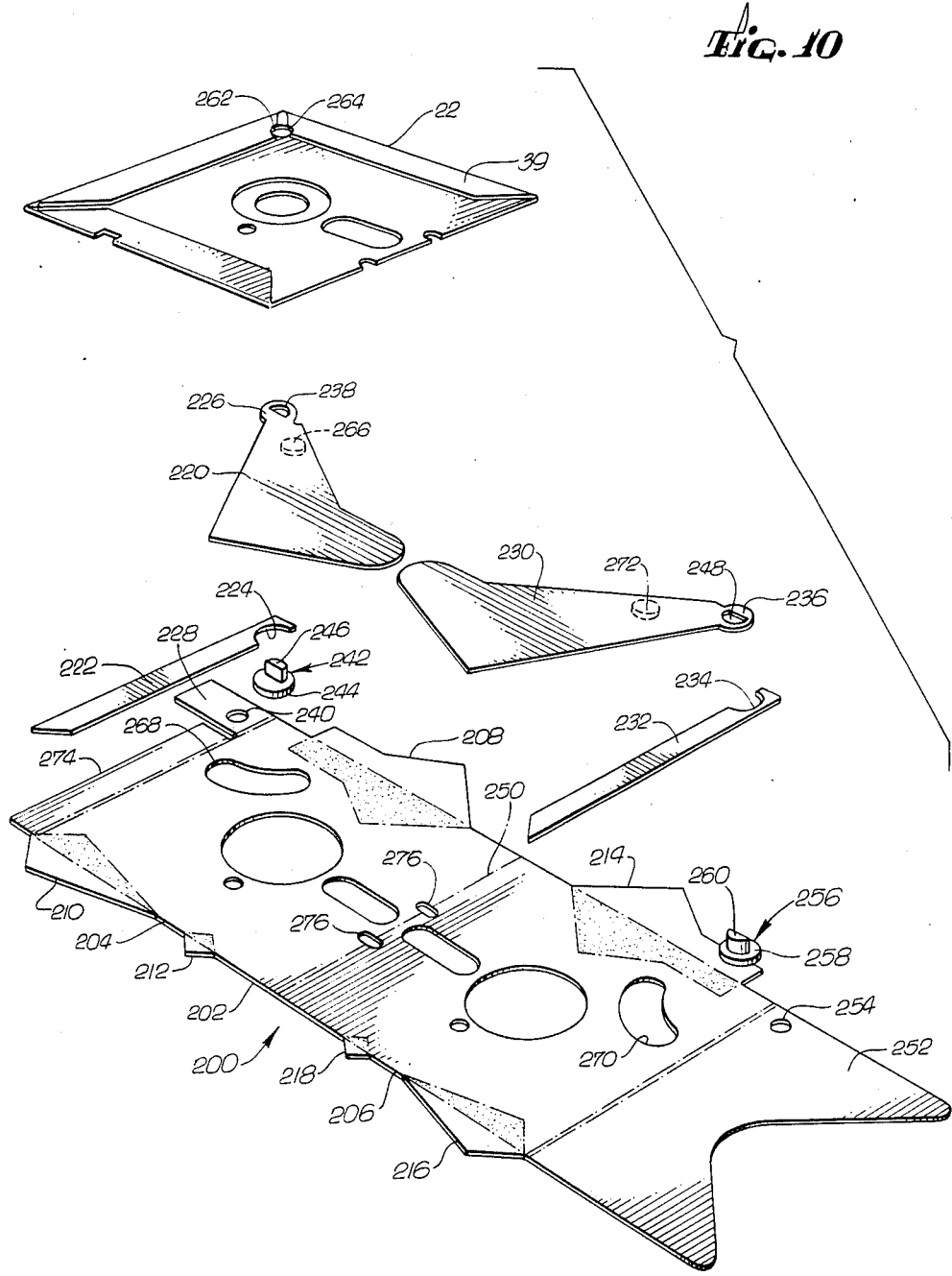
FIG. 10 is an exploded view of another embodiment of the present invention which employs a means to enable the shutters to be operated in unison.

Another embodiment of the present invention is shown in FIG. 10. This protection device 200 is for use over an already jacketed floppy diskette. A thin flat member 202 which forms the top layer also has integrally formed with it spacer members, portions of the bottom layer and a sealing flap, and a small flap as will be described. Member 202 is comprised of a suitable dust shedding material such as has been described previously with respect to the other embodiments of the present invention, e.g., Tyvek material. Referring to FIG. 10, the main portion of member 202 is comprised of adjacently located first and second side portions, 204 and 206, respectively. Extensions 208, 210 and 212 located along the edges of the first side portion 204 are integrally formed with it and are foldable over the first side portion 204. Extensions 208, 210 and 212 are folded over onto the first side portion 204 as indicated by the dashed areas enclosed by the broken lines and are held there by use of suitable adhesives to form spacers. Similarly, extensions 214, 216 and 218 on the second side portion 206 are folded over to form spacers.

The extensions 208, 210 and 212 form spacers for the layer in which shutter 220 is placed along with an end spacer 222 which contains an arcuate cutout forming a partial socket 224 to guide the circular protrusion 226 at the end of shutter 220. Similarly, extensions 214, 216 and 218 form spacers in the layer in which shutter 230 having a circular protrusion 236 is placed along with end spacer 232. End spacer 232 also has an arcuate cutout forming socket 234 for circular protrusion 236.

The end spacers 222 and 232 are secured in place on the first and second side portions 204 and 206 respectively by suitable adhesives.

Shutter 220 has a semi-circular opening 238 in its protrusion 226. A first fastening element 242 having a large circular head 244 and a semi-cylindrical shaft 246 is placed through the semi-circular opening 238, its head 244 resting on first side portion 204. A small flap 228 provided with a circular opening 240 whose diameter is approximately equal to the diameter of shaft 246 of first fastening element 242 extends beyond the end of the first side portion 204. Small flap 228 is folded over the first side portion 204, a portion of shutter 220 and a portion of extension 208, with the opening 240 being slipped over shaft 246. Adhesive material is used to secure small flap 228.

Shutter 230 has a complementary semi-circular opening 248 in its protrusion 236. A second fastening element 256 identical to the first fastening element 242 having a head 258 and a shaft 260 is pressed into and through the semi-circular opening 248 in shutter 230, its head 258 resting on second side portion 206. A flap 252 extends off of the end of second side portion 206 and is foldable over it. Flap 252 is folded over the second side portion 206, the shutter 230 and the extensions 214, 216 and 218 (which themselves have previously been folded over to form spacers). It is attached to second side portion 206 and extensions 214, 216 and 218 by suitable adhesives in areas where the shutter 230 does not move. Flap 252 has a small circular opening 254 of the same diameter as the shafts 246 and 260 of the first and second fastening elements 242 and 256 respectively. This opening is located so that it is slipped over shaft 260 of the second fastening element 256 when flap 252 is folded as described.

Member 202 is provided with openings corresponding to the central openings 30, the access openings 34 and the synchronization openings 36 in the floppy diskette jacket 26, as well as small openings 264 corresponding to the notches 38 in the edge 40 of the jacket 26, as has been described with respect to the top layer 56 illustrated in FIG. 5 for the first preferred embodiment.

In addition, the first side portion 204 contains a slot 268 through which a small protuberance 266 on the shutter 220 extends while second side portion 206 contains a corresponding slot 270 through which a small protuberance 272 on the shutter 230 extends.

Only the second side portion 206 is provided with a flap 252 which folds over the entire width of the member 202. This side of the protection device 200 is folded over the side of the jacket 26 of the floppy diskette 22 which contains the flaps 39 which could otherwise interfere with the movement of the shutter 230. As the other side of the floppy diskette jacket 26 contains no such flaps, a full flap corresponding to flap 252 is unnecessary on that side. The small flap 228 serves to secure the shutter 220 in the protection device 200 before it is installed onto a floppy diskette 22. There is also an optional sealing flap 274 which extends beyond the end of the first side portion 204 and is used in the installation of the protection device 200 on a floppy diskette 22, as will be described.

The preferred embodiment of the present invention shown in FIG. 10 is installed by placing the edge 40 of the floppy disk 22 against the protection device 200 along the broken line 250 with the notches 38 of the floppy disk aligned with the openings 276. The first and second side portions, 204 and 206, respectfully, are then folded over the two sides of the jacket 26 with the corresponding openings in the first and second side portions aligned with the corresponding openings in the jacket 26, i.e., the central opening 30, the access opening 32 and the synchronization opening 36. This fold, due to the thickness of the diskette 22, may actually be two closely spaced folds. Suitable adhesives applied to portions of the first and second portions 204 and 206, to the sides of the flap 252 and small flap 228 (flap 252 and small flap 228 have at this point been folded over), and extensions 208, 210, 212, 214, 216 and 218 (which also have been folded over) are used to secure the protection device 200 to the floppy diskette 22. Sealing flap 274 is then folded over the edge of the floppy diskette 22 opposite edge 40 and sealed there. As with the preferred embodiment described with reference to FIG. 5, a backing member may be used until such time as the protection device 200 is deployed.

In this embodiment, the jacket 26 of the floppy diskette 22 is provided with auxilliary small openings 262 and 264 which are the same size as the small circular openings 240 and 254. Referring now to FIGS. 11 and 12, when the protection device 200 is installed onto a floppy diskette 22, the first and second fastening elements 242 and 256 are pushed through the floppy diskette 22 against the opposite shutters, shutter 220 in the case of the second fastening element 256 and shutter 230 in the case of the first fastening element 242, respectively. The flat sides of the shafts 246 and 260, because of the complementary orientations of the semi-circular openings 238 and 248, overlap one another, as shown in FIGS. 11 and 12. Therefore, due to the overlapping semi-cylindrical shafts 246 and 260, when one of the shutters 220 or 230 is rotated, the other shutter correspondingly rotates, the operation of the shutters being coupled. As a result, one of the two slots 268 or 270 and the protuberance 266 or 272 on the corresponding shutter may be eliminated, both shutters being operated by means of the movement of the protuberance on one of the shutters in the corresponding slot.

An alternate means of coupling the rotation of the shutters 220 and 230 together which does not require auxilliary holes through the jacket 26 of the floppy diskette 22 is illustrated in FIGS. 13 through 15. In this embodiment, the shutters 320 and 330 are identical to the shutters 220 and 230 described with respect to the embodiment illustrated in FIG. 10 except that they have small rectangular openings 322 and 332 in the areas of their respective protrusions corresponding to the protrusion 226 and 236 in FIG. 10. Slightly larger openings 324 and 326 are located in the corresponding first and second portions 304 and 306 respectively above the openings 322 and 332. A C-spring clip 328 having a first rectangular pressing portion 334 and a second rectangular pressing portion 336, as shown in FIG. 15, which are sized to be accommodated in the openings 322 and 332 respectively, is slipped over the edge of the floppy disk 22 with the protection device 338 inserted thereon so that the first and second rectangular pressing portions 334 and 336 respectively are placed through the openings 324 and 326 and in the openings 322 and 332 in the shutters.

C-spring clip 328 is fabricated so that the first and second rectangular pressing portions 334 and 336 respectively tend to press toward one another enough to remain within the openings 322 and 332 respectively.

Therefore, the rotation of C-spring clip 328 will cause both shutters to rotate with it.

FIG. 16 shows a feature of the present invention which may be included in the embodiments of the present invention heretofor described. This feature permits the shutter 400 to be secured alternately in the open and closed positions. An hourglass spring 402 is used along with a spring cam 404 mounted on the shutter. Hourglass spring 402 comprises a wire bent generally in the shape of a U having a narrow portion in its central area and tapering again to a larger portion near its ends. Spring cam 404 comprises a narrower portion 406 adjacent the shutter 400 and a wider portion 410 thereabove, the narrow portion sized to accommodate the wire of hourglass spring 402 as can be seen in FIG. 17. Hourglass spring 402, at its central portion, has a width less than the narrow portion 406 of spring cam 404 so that hourglass spring 402 resists the movement of spring cam 404 past this narrower portion. However, spring cam 404 may be pushed from side to side across the narrow portion of hourglass spring 402 due to the elasticity of hourglass spring 402, hourglass spring 402 riding in the groove formed at the narrow portion 406 of spring cam 404.

A spring retaining block 412 having a generally U shaped channel for containing a portion of the hourglass spring 402 is used to secure the spring to the device. Spring retaining block 412 may be made of plastic adhesively bonded to a portion of the protection device, for example with respect to the embodiment shown in FIG. 10, to the first and second portions 204 and 206 of the layer 202. Spring retaining block 412 may be on the order of 0.020 of an inch in thickness while the wire of hourglass spring 402 may be 0.015 inches in diameter.

While a number of embodiments of the present invention have been described, numerous other variations and combinations are possible. For example, with respect to the embodiment shown in FIG. 10, the extensions 208, 210, 212, 214, 216 and 218 may be replaced by spacer members which are adhesively attached to the first and second portions 204 and 206.

As another variation, an embossing of the top layer may be used to create the effect of spacers in some areas. For example, with respect also to the embodiment shown in FIG. 10, around the openings in the first and second portions 204 and 206 corresponding to the access openings 34 in the jacket 26, embossing may be used.

As another example, fastening elements other than those described with respect to the embodiment shown in FIG. 10 may be used to couple the operation of the shutters.

Thus, the present invention is not intended to be limited to the embodiments herein described.

I claim:

1. A device for installation onto a jacketed floppy diskette having a jacket with a first side and a second side on opposite sides of a disk and four edges at which said first and second sides meet at their perpheries, said floppy diskette having a central opening and a read-write access opening in each side of said jacket said floppy diskette of the type which is typically inserted into a disk drive having guides for opposing edges of the jacket, said device for protecting said floppy diskette by covering the central openings and the read-write access openings in the sides of said jacket when said floppy diskette is not in use and by uncovering said openings when said floppy diskette is in use, said device remaining installed when said floppy diskette is inserted into a disk drive, said device comprising:

an assembly having thin first and second portions corresponding to the first and second sides of a floppy diskette jacket, said assemlby foldable over a first edge of said jacket to place said first portion adjacent the first side of said jacket and said second portion adjacent the second side of said jacket, said first and second portions attachable respectively to said first and second sides when said assembly is folded over said first edge, said first and second portions not covering said respective openings in the sides of said jacket and not extending over the other edges of said floppy diskette jacket when so attached;

a first substantially flat shutter rotably held by said first portion against said first side of said jacket, said first shutter for movement in a plane generally parallel to said floppy diskette between a first position for covering said openings in said first side of said jacket and a second position for uncovering said respective openings; and a second substantially flat shutter rotatably held by said second portion aganst said second side of said jacket, said second shutter for movement in a plane generally parallel to said floppy diskette between a first position for covering said openings in said second side of said jacket and a second position for uncovering said respective openings.

2. A device as in claim 1 wherein said first shutter and said second shutter do not extend in their first or second positions beyond the edges of said jacket when said device is installed onto a floppy diskette.

3. A device as in claim 1 wherein said assembly comprises:

a first, thin, flat bottom member corresponding to said first side of said jacket, said first bottom member for attachment to said first side of said jacket;

a second, thin, flat bottom member corresponding to said second side of said jacket, said second bottom member for attachment to said second side of said jacket;

a first spacer layer comprising at least one flat spacer member attached to said first bottom member;

a second spacer layer comprising at least one flat spacer member attached to said second bottom member; and a top member located over said first and second spacer layers, said top member attached to said spacer layers on the side of said spacer layers opposite to which said spacer layers are attached to said bottom members, and wherein said first shutter is located between said first bottom member and said top member, said first spacer layer being located to permit said first shutter to rotate between said first position and said second position without overlapping said at least one spacer member in said first spacer layer; and said second shutter is located between said second bottom member and said top member, said second spacer layer being located to permit said second shutter to rotate between said first position and said second position without overlapping said at least one spacer member in said second spacer layer.

4. A device as in claim 1 wherein said first and second shutters rotate about a common axis and further comprising a means for coupling said first shutter to said second shutter so that said first and second shutters simultaneously move between said first positions and said second positions.

5. A device as in claim 4 wherein said means for coupling comprises a fastener coupled to said first and second shutters through openings in corners of the sides of the floppy diskette jacket.

6. A device as in claim 4 wherein said means for coupling comprises a spring clip having a first end and a second end, the first end being coupled to said first shutter proximate to said axis of rotation and the second end being coupled to said second shutter proximate to said axis of rotation, said clip having a portion between said first end and said second end passing over an edge of the floppy diskette jacket.

7. A device as in claim 1 wherein at least one of said shutters has on its side facing away from said floppy diskette a means for rotating said shutters.

8. A device as in claim 7, wherein said means for rotating said shutters comprise a protuberance located on the surface of said shutters at least one of said facing away from said floppy diskette.

9. A device as in claim 3 wherein said bottom members have adhesive material on their surfaces facing away from said spacer layers, said adhesive material for attachment of said device to a floppy diskette, and further comprising a flat backing member over said surfaces of said bottom members, said backing member covering said adhesive material until said device is installed onto a floppy diskette, said backing member being peelable away from said bottom members.

10. A device as in claim 1 further comprising for each shutter a biasing means for biasing each shutter in said first position.

11. A device in claim 10 wherein said biasing means comprises an elastomer member connected between each said portion of said assembly and the corresponding shutter.

12. A device as in claim 10 wherein said biasing means comprises a spring connected between each said portion of said assembly and the corresponding shutter.

13. A device as in claim 8 further comprising an hourglass spring for engaging said protuberance, said hourglass spring having a first and second leg forming a narrow central channel portion therebetween and wider portions on either side of said central portion, said first and second legs pressing toward one another to resist the movement of said protuberance through said central channel portion unless a sufficient force tending to rotate said shutters is applied thereto to separate said first and second legs by the pressing thereon of said protuberance thereby allowing said protuberance to move therethrough, said hourglass spring located so that said shutters remain in their respective first or second position unless such a force is applied.

* * * * *